Patented Apr. 27, 1937

2,078,353

UNITED STATES PATENT OFFICE 2,078,353

ARTICLES AND METHOD OF MOLDING

Charles A. Thomas, Dayton, Ohio, assignor, by mesne assignments, to Monsanto Chemical Company, a corporation of Delaware No Drawing. Application July 24, 1930, Serial No. 470,533

7 Claims. (Cl. 18—55)

This invention relates to the manufacture of a molding composition and to molded articles made therefrom.

One of the principal objects of the invention is to provide a method of treating a resin, and more especially a synthetic resin, to produce a product, which is especially adaptable to the production of superior molded articles, and the like.

Another object is to produce such product, and formed bodies made through its utilization.

Still another object of the invention is to provide a method of "vulcanizing" a synthetic resin to provide an amorphous product which may act as a binder in the production of molded articles, and which is of very superior heat and moisture resisting qualities.

Still another object is to provide a "premold", and a method of producing it, which has the characteristic of forming, to an extraordinary degree, a bond with an outer envelope or coating for such premold.

Another object is to provide a molding composition, comprising a synthetic resin, and formed articles of superior characteristics as to heat and water resistance, rigidity and capacity to take a coating of paint or the like.

Yet another object is to produce a molding composition which can be cold molded to produce molded articles of satisfactory quality at relatively low cost of manufacture.

Other objects and advantages of the present invention will be apparent from the description thereof set out below, and from the appended claims.

In the practicing of my invention I employ a synthetic resin which is described as produced from unsaturated hydrocarbons by polymerization, in the presence of an activating agent, and which has characteristics of marked superiority and value. Preferably, it is this resin which is utilized in the carrying out of the present invention. The copending applications of Charles A. Thomas and Carroll A. Hochwalt, Serial No. 294,491, filed July 21, 1928, now Patent No. 1,836,629, patented December 15, 1931; Carroll A. Hochwalt, Serial No. 461,799, filed June 17, 1930, and of Charles A. Thomas, Serial No. 461,807, filed June 17, 1930 disclose and claim the preparation of a synthetic resin of this character from a fraction of cracked petroleum distillate and from unsaturated hydrocarbons such as described below.

The present application relates to the production of a molding composition and molded articles from a polymerized hydrocarbon resin of the type described in the applications and patent referred to above.

Very satisfactory results have been secured when using a resin made from an unsaturated hydrocarbon having one double bond, reacted with an unsaturated hydrocarbon having more than one double bond in controlled proportions and under controlled conditions of polymerization, in the presence of a suitable catalyst or activating agent, such as anhydrous aluminum chloride. Thus very satisfactory results are secured by reacting a mixture of an olefine with a diolefine under such controlled conditions.

As examples of diolefine compounds which react with good results in this manner, there may be mentioned hexadiene $(CH_2=CH-CH_2-CH_2-CH=CH_2)$, isoprene

and butadiene ($CH_2=CH-CH=CH_2$), these being representative members of this group.

As examples of olefine compounds which react with the diolefine compounds, in the above manner, the amylenes may be mentioned as representative. These include symmetrical methyl ethyl ethylene ($CH_3-CH_2-CH=CH-CH_3$), unsymmetrical methyl ethyl ethylene

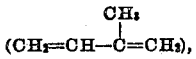

trimethyl ethylene

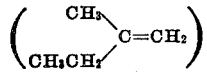

and normal propyl ethylene or pentene

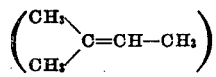

Other unsaturated hydrocarbons having one double bond or olefines will react in this manner with diolefines. Thus ethylene ($CH_2=CH_2$) can be used by feeding in the compound as a gas into the reaction mixture. Likewise propylene (CH₃CH=CH₂)

and octylene (C₈H₁₆) produce resins in this manner.

As an example of the carrying of this invention into effect, the following procedure is described for the reaction or polymerization of normal propyl ethylene with hexadiene.

A mixture of these unsaturated hydrocarbons in the proportion of about one to two mols of normal propyl ethylene to about one mol. of hexadiene, is reacted in the presence of a suitable activating agent such as powdered anhydrous aluminum chloride, with agitation of the mixture. This activating material is added in small quantities at a time, while the temperature of the reacting mass is controlled to prevent objectionable rise of temperature. The reaction is preferably carried out above 20° C., very satisfactory results being obtained between 25° C. and 35° C. The addition of aluminum chloride is repeated with continuous agitation until no further temperature rise results.

In addition to aluminum chloride other compounds which hydrolyze in water giving an acid reaction will function satisfactorily to cause the conversion of unsaturated hydrocarbons into resin,—for example, chloride of iron, boron, zinc, antimony, titanium and tin; benzene sulfonic acid; propyl alcohol saturated with HCl gas; ethyl sulfate and aniline hydrobromide. The reaction is preferably completed in less than twelve hours, about four to six hours giving optimum results.

The resulting reaction product is a viscous mass dark in color. This viscous material is then neutralized to terminate or kill the polymerizing reaction. Various water soluble alkalies may be used for this neutralizing, but preferably ammonium hydroxide is employed as the excess of this material can be removed by distillation and has no injurious effects on the resulting resin. The neutralizing treatment is preferably carried out in the presence of a non-aqueous organic hydroxy compound, such as an alcohol. Thus a mixture of about 40% by volume of ammonium hydroxide containing 28% NH₃ by weight and 60% by volume of 95% ethyl alcohol gives good results. The mass is agitated constantly during the neutralization and a granular percipitate of the activating agent is produced which is readily removed by filtration—for example where aluminum chloride is used a precipitate of aluminum hydroxide is formed. The neutralization is accompanied by a color change, the reacting mass changing from a black or dark red to a yellowish red as the neutralization is completed. The agitating and neutralizing action is completed in about a half hour.

A portion of the resin reaction product may also precipitate, and in order to insure complete solution of the resin before filtration, an organic solvent which is immiscible in water, such as benzol, carbon tetrachloride, or the like, is added to the neutralized mass before filtration. When reacting unsaturated hydrocarbons in this manner, it is found that two products are formed, one being an amorphous resinous compound readily soluble in organic solvents such as benzol, and another being a gelatinous compound insoluble in such solvents. This insoluble compound is carried down in the precipitate. The material is then filtered to remove the precipitated material and to free the reaction product from the activating agent. The filtrate is then distilled to approximately 100° C. when substantially all of the alcohol and benzol, and any water, will have been driven off of the resulting resin, which remains as a semifluid or a pasty mass. The resin obtained by the above described method, and hereinafter referred to as "soft resin", is a semisolid containing some unsaturated higher oils, which may be said to hold the resin in solution. If desired the concentration of the resin may be controlled so as to leave a calculated amount of solvent in the resin so that it is maintained in solution form.

If a solid resin is desired the distillation is continued as described above until substantially all of the readily volatile solvents have been driven off, sufficient solvent or retained higher oils being left in the resin to form a semi-fluid pasty mass. When a hard resin is desired this semifluid mass containing higher oils may be further purified either by solution and reprecipitation, or by a drying treatment. In using the solution and reprecipitation method, the pasty mass is dissolved in an organic solvent which is immiscible in water such as benzol, and is then reprecipitated by the addition to the solution of a quantity of an organic solvent which is miscible with water such as alcohol. This mass stratifies into two layers, a lower layer containing the precipitated resin, and an upper layer of the mixed benzol and alcohol containing therein the dissolved higher oils. The precipitated resin may be separated by filtration or decantation and dried, a harder resin being thereby obtained which is substantially free from higher oils.

In using the drying treatment, the pasty mass may be dried by passing a non-oxidizing gas such as carbon dioxide through the mass, while the same is being agitated and heated to a temperature of about 180° C. This treatment drives off any remaining solvent and higher oils which tend to make the resin soft. The resulting resin is then allowed to cool and harden.

The resin product obtained by the above described purifying treatments and hereinafter referred to as "hard resin", is a rigid solid substantially free from unsaturated oils, and varying in degree of hardness.

The proportions in which olefines and diolefine compounds are used in this reaction, largely determine the character and yield of the resultant resin. When a diolefine alone, such as isoprene, is treated in the manner described a negligible amount of resinous material is obtained. When an olefine, such as amylene, is treated alone in the manner described, a heavy oil results, and a hard resin cannot be produced. By properly proportioning the quantities of olefine and diolefine, a happy medium is struck between the yield of resin and the hardness or quality of the resin. A good hard resin can be obtained by reaction of an olefine with a diolefine in relative proportions ranging from approximately 40% to 60%; the use of approximately 1 mol. of an olefine, such as amylene, to 1 mol. of a diolefine, such as isoprene giving a very satisfactory resin. As the proportion of olefine is increased the resultant resin is softer, and vice versa, as the proportion of diolefine is increased the resin is harder. Within the proportions specified to produce best yields, the resin may be freed of unsaturated oils, and so hardened, by the precipitation or drying processes previously described; but increasing the relative proportion of olefine above that specified,—that is, to more than 60% of olefine will produce a correspondingly softer resin which will not harden satisfactorily even on drying or reprecipitation. On the other hand, increasing the relative proportion of diolefine, that is, to more than 60%, will produce a correspondingly harder resin but with an increasingly poorer yield. The most suitable proportions for various unsaturated hydrocarbon mixtures can be readily determined by experiment in each case, and these proportions used in plant operation for optimum yield of the particular resin desired.

The term "unsaturated hydrocarbons" as used herein refers to hydrocarbon compounds which unite with other compounds, such, for example, as the halogens, to form addition products without splitting off a new compound. Such unsaturated compounds are capable of giving the Baeyer test for unsaturation. (Text Book of Organic Chemistry, Holleman, 6th edition, page 131.) It is to be understood that the term unsaturated hydrocarbons as used herein is intended to include compounds of the class described above which are derived from petroleum distillates, as for example, by cracking processes and which are substantially free from coumarone-indene constituents.

While the exact chemical reaction taking place is not definitely known, it appears that the reaction between the olefine, or hydrocarbon having an ethylene or methylene linkage and having one double bond, and the diolefine, or aliphatic diene having more than one double bond, is first a reaction of the former with the latter, whereby a cyclic diene having more than one double bond is produced. The molecules of the cyclic diene may then unite by polymerization to give unsaturated cyclic hydrocarbons of high molecular weight, thereby producing the resin of the present invention. This resin has been found to be an unsaturated hydrocarbon believed to have the empirical formula $(C_nH_{2n-2})_x$, and possessing a molecular weight of about 900 to 1400.

The resin so prepared in accordance with this invention is found to have a yellow shading to amber color, and is fairly clear. When dissolved in a suitable solvent such as naphtha, the resin forms a clear amber liquid, which when brushed onto a surface leaves a clear film which is practically colorless or has only a faint yellowish color. The prepared resin is substantially neutral in reaction and is unsaponifiable. It is normally a mixture of the amorphous synthetic resin and of some proportion of oils produced during the resin forming reactions, and is distinctive from any other known synthetic resins in that it has a very high iodine value, and a particularly high iodine value on a basis of presence of unsaturated compounds. This iodine value, of the produced resin, ranges normally from 175 to 200, which is much above that of any other known resin, particularly any neutral resin.

It has been found that when this resin is incorporated with a material such as sulphur and then heated, the result is to produce a reaction, which for convenience in description is termed a "vulcanization", which causes a marked change in the characteristics of the resin to produce a product which is amorphous, has binder characteristics, is infusible, and takes its permanent set within an extremely short period—a minute being ordinarily sufficient for this purpose. The same results may be secured through the utilization of other functionally similar materials, for example—by oxidizing the resin, or otherwise disrupting the plural bonds to form similar addition products. In effecting this the resin and sulphur are liquefied. Apparently the sulphur dissolves in the molten resin and then a reaction takes place, apparently at about 170° C. This reaction changes the character of the resin from that of a "thermoplastic" material to that of a material capable of taking a permanent set. That is, when the reaction product is cooled, it will take a permanent form or set which will not be destroyed by ordinary heating. This resin composition is capable of being molded preferably with a suitable filler such as wood pulp, asbestos fiber, or the like, to produce various types of articles, such as electrical insulating parts, panels for radio cabinets, and the like.

In manufacturing this molding composition the synthetic resin is placed in a suitable mixer, such as an ordinary dough mixer. This mixer is provided with a suitable jacket or other means of controlling temperature. The resin is first heated in the mixer, generally to about 150° C., then sulphur is added in proportions of from about 2% to 10%, commercial flowers of sulphur being used. Before reaching the reactive temperature of approximately 170° C. wood flour is usually added, though other fillers may be used, such as wood pulp, rags, linters, tire fibre, asbestos, etc. The desired filler is added below the reacting temperature and the mixture is kept in the mixer at a temperature of around 150° C. until the filler is saturated and thoroughly impregnated by the resin. This condition may be judged by the appearance and characteristics of the mixture. The proportion of filler used varies with the product desired. A high proportion of resin gives a product which will take a high polish, while a high proportion of filler gives a cheaper product having greater strength. The practical range of proportions used is—resin from about 5% to 50%, sulphur about 3% to 20%, while the percentage of filler is approximately the difference between the sum of the resin and sulfur and 100%. The material in the mixer is heated for approximately one hour, the time of heating being somewhat affected by the volume of the mix. Temperature in the mixer is kept under the reaction temperature, that is, it does not reach 170° C. Slow mixing speeds have been found to give best results. Heating the mixture somewhat longer than necessary has been found to have no objectionable effect. When the appearance of the filler indicates that it has been completely saturated by the resin it may be removed from the mixer. When cooled the material is then ready to be molded. When dried as for sale and distribution as a molding composition, the material has largely the appearance of the filler alone.

In molding articles from this molding composition any suitable conventional form of mold may be used, depending on the article to be molded. Such a mold generally comprises an outer metallic casting or shell, an inner work chamber adapted to receive the material to be molded, and a jacket surrounding the work chamber to which a suitable heating medium, such as steam, is supplied. A plunger connected to a suitable operating mechanism or crank, is positioned to move within the work chamber and compress the molding material therein to the desired pressure. Temperature, pressure, and time of compression vary according to the product desired. The vulcanization reaction begins at approximately 170° C. and the heat of the press is usually kept at approximately 170° C. to 185° C. and pressure of about 7700 pounds per square inch for approximately one minute. The material is allowed to cool in the press and is removed from the press after cooling. These molding processes and any variations necessary for making specific articles may be carried out according to accepted practice in making molded articles. The mold may be soaped before adding the mixture in order to facilitate the removal of the molded article.

It has been found that during the heating in the mixing process, the fibers of the filling material appear to be completely impregnated by the molten resin. Other resins which have been used in a somewhat similar manner appear to form a coating or envelope on the fibers and do not secure the uniform impregnation and thorough penetration of the fibers described. Such impregnated fibers produce a very satisfactory molding compound which is impervious to water and highly resistant to acids and alkalies.

It has been further discovered that where a more elastic product is desired as where objects are to be molded which will be subjected to shock, such as steering wheels, handles for apparatus and the like, certain plasticizing agents may be advantageously added to the compositon. Suitable plasticizers are such compounds as dibutyl phthalate, diamyl phthalate, and chlorinated diphenyl. These do not enter into the reaction of the resin and sulfur. Drying oils such as linseed oil, China-wood oil, and other unsaturated oils and non-drying oils such as castor oil, may also be used as plasticizing agents. Where an unsaturated oil is added, some of the sulfur added to the composition is used up by the unsaturated oil during the ensuing reaction. Consequently, when an unsaturated oil is used, an additional amount of sulfur equivalent to the amount used up by the plasticizing agent in the reaction is added. The amount of plasticizer or unsaturated oil added may be about 1% to 15% of the total weight.

When desired to give added strength, a central core such as a metallic core may be used for the molded product. For example, this composition may be used for molding rings in which is a central core of spring steel. When molded and set, the molded composition holds the spring steel core in its set position against the resiliency of the core.

I have further discovered that the molding composition of this invention is particularly valuable for use as a premold, that is, for a mold which is to be covered by an outer coating or envelope of a different and usually more expensive material, such as pyralin, cellulose acetate etc., to produce the finished article. A material which is to be used as a premold should not change under heating. Steel and other metals such as aluminum have usually been used as premolds. The molding material of my invention has the valuable property of forming a permanent bond between the premold and the coating. It is believed a chemical reaction takes place between the reaction product of sulfur with the synthetic resin described and a coating such as pyralin or cellulose acetate. Consequently, instead of the peeling and chipping of the coating from the molded article, which often takes place when other molding compounds are so used, a permanent bonding is secured between the coating and the premold formed from this molding composition, and it is extremely difficult if not impossible to remove the coating from the molded article.

The addition of an inert plasticizing agent such as dibutyl phthalate, does not decrease this bonding effect, but may even facilitate it, where the plasticizer used, being brought to the surface by heating in the mold, has a solvent effect on the outer coating used. An unsaturated oil when used as a plasticizing agent, enters into the reaction with the resin and the sulfur to form a reaction product which when used as a premold also forms a permanent chemical union with the outer coating, in the manner above described.

This molding composition has also been found to be adapted to a cold molding process. In such a process the molding composition is cold molded to the desired shape, pressure alone or pressure with relatively low heat being used. The pressed parts are then removed without cooling or cure, and when used as a premold they are then placed in a suitable mold, surrounded by the desired coating material, such as cellulose acetate, in a proportion to secure a coating of the desired thickness. The premold and the coating material are then heated together in a hot mold, to produce the finished product by a single heating operation. If finished articles are to be made by cold molding, the operations of cooling, of cure, and of hardening afterward by means of heat are not necessary. This procedure materially reduces the time required, and also the cost of the process.

The color and finish of the finished article depends largely on the filler used. Fine fillers, such as wood flour, produce an article capable of taking a high polish when polished with an oil, such as lubricating oil. A relatively large proportion of resin also increases the capacity of the product for taking polish. A relatively high proportion of filler gives a cheaper and less brittle product. When a long fibered filler is used, the product has greater strength. The fact that the fibers are impregnated with the resin instead of being merely coated makes it possible to secure a product having more resin per unit weight of filler than has been heretofore possible. The color of the material is usually dark, but if white fillers are used, a light colored material suitable for use with pigments is secured. Dielectric strength, tensile strength and compressive strength are all comparable to those of other molded products. Articles made from this composition are substantially unaffected by water, acids, alkalies, or mineral oils. The vulcanized products do not depreciate with age, and are resistant to heat up to high temperatures, such for example as 700° F. to 800° F. and to cold down to subzero temperatures. As stated above, articles molded from this material are suitable for molding over or around metallic inserts and have fair machining qualities. The material has good electrical insulating properties, and is a good heat insulator.

The exact proportion of materials used, and the time, temperature and pressure required in manufacturing the molding composition and in molding the finished articles, will vary with the specific product desired or the article to be produced, and suitable type formulas can readily be determined by experiment.

Examples of the specific application of this invention are the following type formulas:

Material suitable for premold:

| | Percent by weight |
|---|---|
| Resin | 20 |
| Sulfur | 4.5 |
| Paper pulp | 46 |
| Wood flour | 29.5 |
| | |
| Resin | 24 |
| Sulfur | 4 |
| Wood flour | 48 |
| Tire fibre | 9.6 |
| Linseed oil | 4.8 |
| Chlorinated diphenyl | 9.6 |
| | |
| Resin | 25 |
| Sulfur | 3 |
| Tire fibre | 22 |
| Shredded paper | 45 |
| Dibutyl phthalate | 5 |

When treated with heat the mixture of synthetic resin, made in the manner described, and a material such as sulfur, forms a novel amorphous body, which has the characteristic that if molded during formation it will take a permanent set, and be quite rigid, infusible, non-reactive with acids or alkalies and water resistant. In addition the reaction which gives this permanent set occurs so rapidly that it proceeds, readily, to completion during the short time the material is in the forming press being molded. In practice the forming press is heated in advance, the mixture of resin, sulfur and filler introduced, the pressing effected at the desired pressure and at a temperature above the reaction temperature of 170° C., the press is then promptly cooled with water and when opened the completed, molded article, with its permanent set is available and ordinarily drops out of the press. In practice the actual time of vulcanization or cure may be less than one minute—and, in fact, in actual operations, as so conducted, there has been no evidence of an undercure or set. It is quite important that the resin of this application becomes molten at a temperature below its reaction temperature during its vulcanization reaction, which permits of making up the molding composition specified above and effecting impregnation of the fibrous material.

This resin is "thermoplastic"—which means that it may be recurrently melted, and molded or formed if desired, by heating it to its normal melting temperature. This resin, when incorporated merely with a filler such as wood flour, wood pulp, or the like, and heated to a suitable plasticity, produces a composition which can be molded into various shapes and which on cooling will retain such shapes as long as they are not subjected to undue heat. This molded composition may be ground and remolded more than once, if desired. Filler and resin may be used in substantially any desired proportions, larger proportions of resin giving articles capable of taking higher polish. High proportions of resin up to 50% appear to be readily absorbed by the fibrous filler, due to the effective impregnation secured. Molded articles made from this composition are not affected by temperatures below 150° C.

When certain agents such as China-wood oil, linseed oil, etc., are incorporated as plasticizers within a mixture of this resin and a filler, then on heating to approximately 170° C., a form of reaction apparently takes place between the resin and the plasticizer. Molded articles made from this reaction product are satisfactory in strength and appearance, and are not visibly affected by temperatures up to 200° C.

When it is desired to use resin and filler alone, or resin with a plasticizer, as an unsaturated oil, and filler, etc., proportions of resin and filler used vary according to the product desired, the general range being as given above. The unsaturated oil plasticizer, when used, may be in proportions of about 5% to 10%.

Material suitable for molded articles where slight strength and less brittleness are required are satisfactorily made from the following compositions, by way of example:

| | Per cent by weight |
|---|---|
| Wood flour | 61.8 |
| Hard resin | 33.4 |
| Shredded paper | 4.8 |
| | |
| Wood flour | 45.4 |
| Tire fibre | 18.2 |
| China-wood oil | 9.1 |
| Castor oil | 9.1 |
| Hard resin | 18.2 |

To produce molded articles, compositions made from these formulas were heated in the mold for one minute at a pressure of 7,700 pounds per square inch at about 182° C.

While the methods and products herein described constitute preferred embodiments of our invention, it is to be understood that the invention is not limited to these precise methods or products, and that changes may be made therein without departing from the scope of the invention which is defined in the appended claims.

What is claimed is:

1. A rigid molded article comprising essentially the reaction product of sulfur and an unsaturated polymerized hydrocarbon which is thermo-plastic and alcohol insoluble, and which is obtained by the polymerization of a liquid mixture of olefines and diolefines in the presence of a metallic halide activating agent, said article having a cellulose ester coat integrally bonded thereto which resists peeling and chipping therefrom.

2. The method of producing a rigid molded article which comprises intimately mixing below reaction temperature a thermo plastic, alcohol insoluble, hydrocarbon polymer, having an iodine value of the order of 175–200 produced by polymerizing a liquid mixture of olefines and diolefines in the presence of a metallic halide polymerizing agent, with a fibrous material and sulfur, and subjecting the resulting mixture, under pressure in a mold, to approximately 180° C. whereby a product is formed which is unaffected by water, acids, alkalies or mineral oils and is resistant to heat up to 700° F.

3. A rigid molded article comprising the reaction product of sulfur and an alcohol-insoluble, polymerized hydrocarbon produced by the polymerization of a liquid mixture of olefines and diolefines in the presence of a metallic halide polymerizing agent, said molded article being substantially unaffected by water, acids, alkalies or mineral oils and capable of taking a high polish when polished with an oil.

4. The article of claim 3 having a filler incorporated therein.

5. A rigid molded article comprising the reaction product of sulfur and an alcohol-insoluble hydrocarbon resin having an iodine value of the order of 175–200 and produced by polymerizing a liquid mixture of olefines and diolefines in the presence of a metallic halide polymerizing agent, and a filler, the ratio of resin, sulfur and filler being 5%–50% resin, 3%–20% sulfur, the remainder being essentially filler.

6. A rigid molded article comprising the reaction product of sulfur and an alcohol-insoluble, polymerized hydrocarbon produced by the polymerization of a liquid mixture of olefines and diolefines in the presence of a metallic halide polymerizing agent, a substantially non-volatile plasticizer for said polymerized hydrocarbon, and a filler, said molded article being substantially unaffected by water, acids, alkalies or mineral oils and capable of taking a high polish when polished with an oil.

7. A rigid molded article comprising the reaction product of sulfur and an alcohol-insoluble, polymerized hydrocarbon produced by the polymerization of a cracked petroleum hydrocarbon liquid consisting of a mixture of olefines and diolefines in the presence of a metallic halide polymerizing agent, said molded article being substantially unaffected by water, acids, alkalies or mineral oils and capable of taking a high polish when polished with an oil.

CHARLES A. THOMAS.